United States Patent
Chen et al.

(10) Patent No.: US 12,299,112 B1
(45) Date of Patent: *May 13, 2025

(54) ALLOCATING REQUESTS

(71) Applicant: Amazon Technologies, Inc., Seattle, WA (US)

(72) Inventors: Yajun Chen, Sunnyvale, CA (US); Katherine Wang Kwan, Los Altos, CA (US); Abraham Martin Passaglia, Seattle, WA (US); Weile Shen, Los Gatos, CA (US); QingYun Wei, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,298

(22) Filed: Feb. 6, 2023

Related U.S. Application Data

(63) Continuation of application No. 16/834,027, filed on Mar. 30, 2020, now Pat. No. 11,574,044.

(51) Int. Cl.
*G06F 21/45* (2013.01)

(52) U.S. Cl.
CPC ...... *G06F 21/45* (2013.01); *G06F 2221/2111* (2013.01)

(58) Field of Classification Search
CPC ....... G06F 21/44; G06F 21/45; G06F 2221/21
See application file for complete search history.

(56) References Cited

U.S. PATENT DOCUMENTS

| | | | |
|---|---|---|---|
| 7,835,722 B2 | 11/2010 | Munje et al. | |
| 2005/0243765 A1* | 11/2005 | Schrader | H04L 41/00 370/328 |
| 2009/0187978 A1 | 7/2009 | Upendran et al. | |
| 2009/0187983 A1 | 7/2009 | Zerfos et al. | |
| 2012/0036564 A1 | 2/2012 | Gu et al. | |
| 2013/0042301 A1 | 2/2013 | Mahamuni et al. | |
| 2014/0068726 A1 | 3/2014 | Jakobsson | |
| 2017/0150513 A1* | 5/2017 | Abraham | H04W 74/0816 |
| 2021/0314775 A1 | 10/2021 | Falk et al. | |

OTHER PUBLICATIONS

Office Action for U.S. Appl. No. 16/834,027, mailed on Dec. 3, 2021, Chen, "Allocating Requests ", 15 pages.
Office Action for U.S. Appl. No. 16/834,027, malled May 23, 2022, Chen, "Allocating Requests ", 16 pages.

* cited by examiner

*Primary Examiner* — Dao Q Ho
(74) *Attorney, Agent, or Firm* — Eversheds Sutherland (US) LLP

(57) ABSTRACT

This disclosure describes, in part, techniques and systems for enabling new devices introduced into respective environments ("provisionee devices") to be provisioned by existing devices in the respective environments ("provisioner devices") in a manner in which the provisioning requests sent by the provisioner devices are allocated over time and, thus, do not overwhelm the provisioning system(s) at any given time.

20 Claims, 13 Drawing Sheets

| Provisioning-System Capacity Data 216(1) | S | S | S | S | S | B | S | S | S | S | S | S | S | S | S | B |
| --- | --- | --- | --- | --- | --- | --- | --- | --- | --- | --- | --- | --- | --- | --- | --- | --- |
| Time-Slot Bitmap 326(1) | 0 | 1 | 0 | 0 | 1 | 0 | 0 | 1 | 0 | 0 | 0 | 1 | 0 | 0 | 0 | 0 |
| Back-Off Bitmap 330(1) | 0 | 0 | 0 | 0 | 1 | 0 | 0 | 0 | 0 | 0 | 0 | 0 | 0 | 0 | 0 | 1 |

FIG. 3B

ALLOCATING REQUESTS

RELATED APPLICATIONS

This application claims priority to and is a continuation of U.S. patent application Ser. No. 16/834,027, filed on Mar. 30, 2020, the entire contents of which are incorporated herein by reference.

BACKGROUND

As use of client computing devices continues to proliferate, so too does the need to provision each new computing device that a user introduces into her home or business. However, provisioning a computing device can be tedious and confusing, and may include steps such as joining the device to a local network, registering the device with a content provider, logging into an account of the user at the content provider, and/or the like. These provisioning operations may impede the ability of users to make these devices operational.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3B illustrates an example schedule of times (e.g., the time-slot bitmap) that is based at least in part on capacity data associated with a particular provisioning system. In addition, this figure illustrates an example schedule of times (e.g., a "back-off bitmap") indicating times at which the provisioner device is to send retry requests on behalf of the provisionee device to the provisioning system in the event that any previously sent provisioning requests fail.

DETAILED DESCRIPTION

Figure 1:
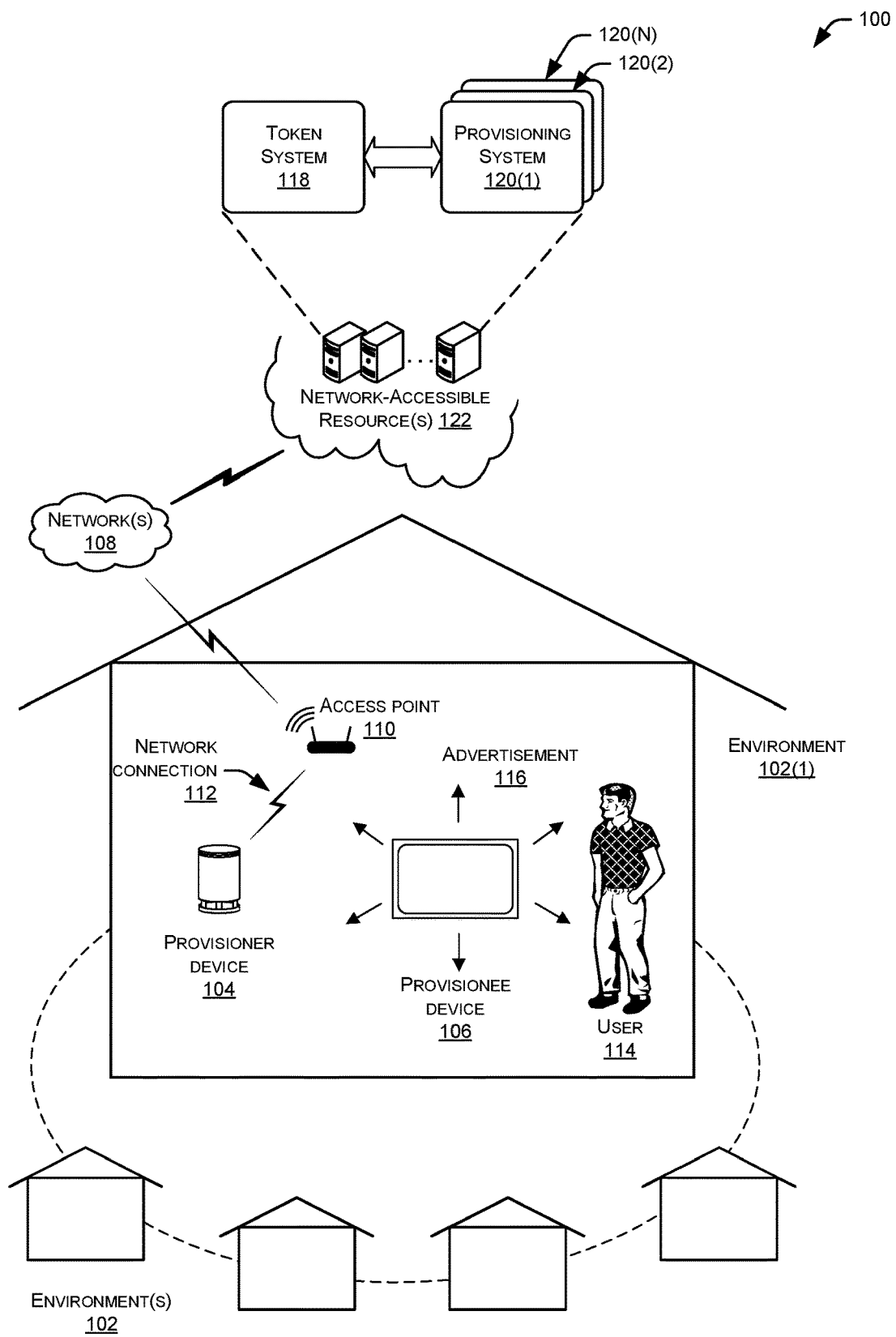
FIG. 1 illustrates a schematic diagram of an illustrative environment in which a new device introduced into the environment (e.g., a "provisionee device") advertises a provisioning request, which is received by an existing device in the environment (e.g., a "provisioner device"). The provisioner device, which is already connected to a network in the environment, may interact with a provisioning system on behalf of the provisionee device to enable the provisionee device to couple to the network, register itself, and so forth. However, prior to doing so, the provisioner device may interact with a token system that is configured to allocate requests sent to the provisioning system across time to avoid overload on the provisioning system at any given time.

This disclosure describes, in part, techniques and systems for distributing requests to be made to a server computing device by different client computing devices to avoid the server being overwhelmed with requests at any given time. For example, the techniques and systems may utilize a token service that instructs individual client computing device as to when the respective client computing devices are to send subsequent requests to the server. The token service may thus allocate the timing of these subsequent requests over time to ensure that the server does not receive too many requests at any given time.

In one example described herein, the systems and techniques enable new devices introduced into respective environments (e.g., "provisionee devices") to be provisioned by existing devices in the respective environments (e.g., "provisioner devices") in a manner in which the provisioning requests sent by the provisioner devices are allocated over time and, thus, do not overwhelm the provisioning system(s) at any given time. Provisioning a new device may include providing network credentials to the new device to enable the new device to join a local network, providing registration credentials to the new device to enable the new device to register with a content or service provider, and/or the like. Both the provisioner and provisionee devices described herein may comprise any sort of client computing device, such as voice-controlled assistants, tablet computing devices, smart televisions (TVs), laptop computer, desktop computers, mobile phones, display devices, audio devices, gaming devices, and/or the like.

To provide an example, a first device may reside in an environment, such as a home, business, school, or the like. The first device may have already been provisioned, such that the first device has been configured to connect to a local network (e.g., has used an SSID and password pair to join to the network), has been registered with a content or service provider that is associated with the first device, and so forth.

Thereafter, a second device may be introduced into to the environment. In some instances, the second device may be associated with a common user account (e.g., at the service or content provider) to which the first device is associated. For example, the second device may have been associated with the common user account at the time of acquisition (e.g., purchase) of the second device, in response to a user scanning a barcode of the second device using a mobile phone or the like, and/or the like.

After, or before, the second device has been associated with the user account, a user may power on the second device. At least partly in response to being powered on, the second device may advertise a request to be provisioned. For example, given that the second device has not been configured to join to a local network (that is, has not been configured with an SSID/password pair), the second device may advertise this request over one or more short range wireless networks, such as Bluetooth, Zigbee, or the like.

In some instances, the first device (and/or one or more other devices in the environment) may receive this provisioning request and, in response, may determine to aid in provisioning the second device. That is, the first device, which is already connected to a local network, may act as a "middle-man" between the second device and a provisioning system for provisioning the second device, which may include providing network credentials to the second device to enable the second device to join the local network, providing registration credentials to the second device to enable the second device to register with a service/content provider, and so forth.

Upon determining to aid in the provisioning of the second device, the first device may send a message back to the second device indicating that the first device will act on behalf of the second device. In addition, the first device may generate a token request and may send this token request to a token system, as described in more detail below. In general, the token system may receive the token request, determine the appropriate provisioning system that the first device is to interact with, allocate request times (e.g., time intervals) for the first device, and send token information identifying the provisioning system and the time(s) back to the first device. The first device may then send one or more provisioning requests to the identified provisioning system at the specified times. It is to be appreciated that the specified requests times may comprise individual times (e.g., individual timestamps), time intervals, and/or the like.

In response to receiving information from the provisioning system, such as network and/or registration credentials, the first device may send this information to the second device (e.g., over the short-range wireless network). The second device may receive this information and provision itself. For example, the second device may use the network credentials to join the local network and, thereafter, may use the registration credentials for registering with the content/service provider. Thereafter, the second device may be deemed "provisioned" and may be ready for use by the user, who only needed power on the second device to provision the device.

While the above example describes a single example of provisioning a device, it is to be appreciated that users across a region, country, or the world may also simultaneously be attempting to provision new devices in their respective environments. Thus, there may be certain times where many provisioner devices are attempting to provision respective provisionee devices at any given time. Therefore, unless these provisioning requests are allocated over time, a provisioning system may receive more requests than it can handle at a certain point in time and, thus, may fail. When the provisioning system fails, each provisioning process that is currently in-process may fail, resulting in the need to restart the process.

The token system described herein may address this problem. For example, upon receiving a request to provision a new device, the token system may first identify the appropriate provisioning system, such as the provisioning system that is responsible for provisioning devices at a geographical location associated with the environment of the provisioner device sending the current request. After identifying the appropriate provisioner system, the token system may communicate with the provisioning system (e.g., via one or more application programming interfaces (APIs) provided by the provisioner system) to determine a capacity of the provisioning system. The token system may then use this capacity, as well as data indicating time slots at which the token system has previously instructed provisioner devices to send provisioning requests to this particular provisioning system, to determine which times the token system is to instruct the current provisioner device to send provisioning requests to the system. Stated otherwise, the token system may allocate the provisioning requests to be sent by respective provisioner devices to the provisioning system over time, such that there is no (or few) times where the provisioning system is overwhelmed with provisioning requests and, thus, fails. Further, in some instances the token system allocates time slots, also referred to as time intervals, to be used by the provisioner devices.

Upon determining the allocated times at which the provisioner device is to send these requests, the token system sends this information back to the provisioner device. The provisioner device receives this token information and sends the provisioning requests to the provisioning system in accordance with the identified times, such as within each indicated time interval. Thus, the provisioning service receives requests from different provisioner devices that have been allocated and smoothed over time, resulting in a higher success rate for the provisioning processes and, thus, a higher level of user satisfaction of users attempting to provision their new devices.

While the above example describes allocating provisioning requests over time, the techniques may be similarly used to allocate any other types of requests over time. For example, envision a scenario where a relatively large number of client computing devices are configured to send respective requests to a server computing device for updates to an application stored on each of the client computing devices. In this example, each client device may be configured to send a token request to a token service, which may be configured to allocate the subsequent application-update requests over time. Each client computing device may receive a respective schedule of times at which the respective client computing device is to send requests for the application updates over time. In yet another example, each client computing device may receive a respective schedule of times at which to send requests to provide or receive any other sort of data, such as requests to provide data logs, receive data logs, and/or the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram illustrating an example environment 100 in which respective users may power on new devices, resulting in these new devices sending respective provisioning requests. As introduced above, in response to each of these new devices sending such a request, an existing, provisioned device in each respective environment may respond to the request and attempt to act as a middle-man to provision the device. However, if these provisioning requests are not allocated over time, a provisioning system may be overwhelmed and may fail.

FIG. 1 further illustrates one such example environment 102(1), which includes a provisioner device 104 and a provisionee device 106. The provisioner device 104 may comprise a device that has already been provisioned and, thus, is connected to a local network 108 via an access point 110 in the environment 102(1), as illustrated vi a network connection 112. The provisionee device, however, may have just been powered on by a user 114 and, thus, might not be connected to the network 108.

In response to being powered on, the provisionee device 106 may be configured to generate and send an advertisement 116, which may comprise a request to be provisioned. The provisionee device 106 may send this request over one or more short-range wireless networks, such as Bluetooth, Zigbee, or the like. In some instances, each device within range of the request may receive the advertisement 116. In this example, the provisioner device 104 receives the advertisement 116 and, in response, may be configured to act as a provisioner for the provisionee device 106. As such, the provisioner device 104 may be configured to send a message back to the provisionee device 106 indicating that the provisioner device 104 will attempt to provision the provisionee device 106.

After determining to act as the provisioner device for the provisionee device 106, the provisioner device 104 may generate a token request for sending to a token system 118, which may be responsible for allocating provisioning requests sent to provisioning systems 120(1), 120(2), . . . , 120(N) over time. As illustrated, the token system 118 and the provisioning systems 120 may be hosted by one or more network-accessible resources 122. While illustrated as being collocated, it is to be appreciated that these resources may be located across different regions and/or across the globe. Further, the network(s) 108 which connect to the network-accessible resources 122 may represent an array or wired networks, wireless networks (e.g., WiFi), or combinations thereof. Further, each of the system(s) of the resources 122 may generally refer to a network-accessible system—or "cloud-based system"—implemented as a computing infrastructure of processors, storage, software, data access, and so forth that is maintained and accessible via the network(s) 108, such as the Internet. Cloud-based systems may not require end-user knowledge of the physical location and configuration of the system that delivers the services. As illustrated, the remote system(s) may comprise the network-accessible resource(s) 122, such as servers. Multiple of such resources 122 may be included in the system(s).

The token request generated by the provisioner device 104 may include a device identifier (e.g., a device serial number (DSN)) of the provisioner device 104, location data (e.g., a device region) indicating a location associated with the provisioner device 104, time-stamp data indicating a time of the request, and one or more additional pieces of data, such as a manufacturer identifier of the device, authentication data used to verify the legitimacy of the request, and so forth. Upon receiving the token request, the token system 118 may, after authenticating the request, use the location data to determine which of the provisioning systems 120 is associated with the location of the provisioner device 104 (and, hence, the environment 102(1)). For example, each of the provisioning systems 120(1)-(N) may be associated with a respective region and, thus, the token system 118 may identify the appropriate provisioning system, such as the provision system 120(1) in this example. In addition, the token system may determine a first schedule of times that the provisioner device 104 is to send respective provisioning requests to the identified provisioning system 120(1). As introduced above, the token system 118 may allocate these requests from different provisioner devices over time to as to avoid the provisioning system 120(1) being overwhelmed at any given time.

In order to determine the first schedule of times, the token system 118 may initially communicate with the provision system 120(1) (e.g., via one or more APIs made available by the system 120(1)) to determine a capacity associated with the provision system 120(1). In addition to the capacity data, the token system 188 may use additional information to determine the schedule of times at which the provisioner device 104 is to send to the provisioning requests to the provision system 120(1). This additional information may include information regarding when the token system 118 has previously instructed other provisioner devices to send provisioning requests to the provision system 120(1), a latency between the provisioner device 104 and the token system 118 (as determined based on the time-stamp data of the token request and a time at which the system 118 received the token request), and the like.

In addition to determining the first schedule of times, the token system 118 may determine a second schedule of times at which the provisioner device 104 is to send retry requests in the event that one or more provisioning requests fail. In some instances, this second schedule of times may be based on time(s) that the identified provisioning system 120(1) has set aside for retry requests and, thus, in some instances the second schedule of times may be common across each provisioner device interacting with the provisioning system 120(1), whereas each first schedule of times may be unique or relatively unique across provisioner devices.

In some instances, the token information generated by the token system 118 may include additional information, such as an expiration time after which the token information is no longer valid, a length of each time slot corresponding to each time indicated in the first and second schedule of times, access-token data that the provisioner device 104 is to use to authenticate its requests at the provision system 120(1), and so forth. After generating the token information, the token system 118 may send this token information back to the provisioner device 104 via the network 108. Upon receiving the token information, the provisioner device 104 may begin sending respective provisioning requests to the provision system 120(1) according to the first schedule of times. If any of the requests fail, the provisioner device 104 may send one or more retry requests according to the second schedule of times.

In some instances, a first provisioning request sent from the provisioner device 104 to the provision system 120(1) may include a first device identifier associated with the provisioner device 104 and a second device identifier associated with the provisionee device 106. Upon receiving these identifiers, the provision system 120(1) may determine whether each of the devices is associated with a common user account. If so, the provision system 120(1) may allow the provisioning process. If not, the provision system 120(1) may discontinue the provisioning process. If the process continues, then the provisioner device 104 may continue to send the provisioning requests to the provision system 120(1), which may receive the requests and send provisioning data back to the provisioner device 104. The provisioning data may include network credentials stored in association with the common user account for joining the local network 108 of the environment 102(1). For instance, the network credentials may include an SSID or other name of the access point 110 and a password associated with the access point 110. In addition, or in the alternative, the provisioning data may include registration credentials to enable the provisionee device 106 to register itself with a content/service provider, such as a same provider associated with the token system 118 and the provisioning systems 120.

Upon receiving these provisioning data from the provision system 120(1) via the network 108, the provisioner device 104 may send this provisioning data to the provisionee device 106 (e.g., via the short-range wireless connection). Upon receiving the provisioning data, the provisionee device 106 may provision itself by, for example, using the network credentials to join the network provided by the access point 110, register with the content provider (e.g., hosted by the one or more network-accessible resources 122), and so forth.

Figure 2A:
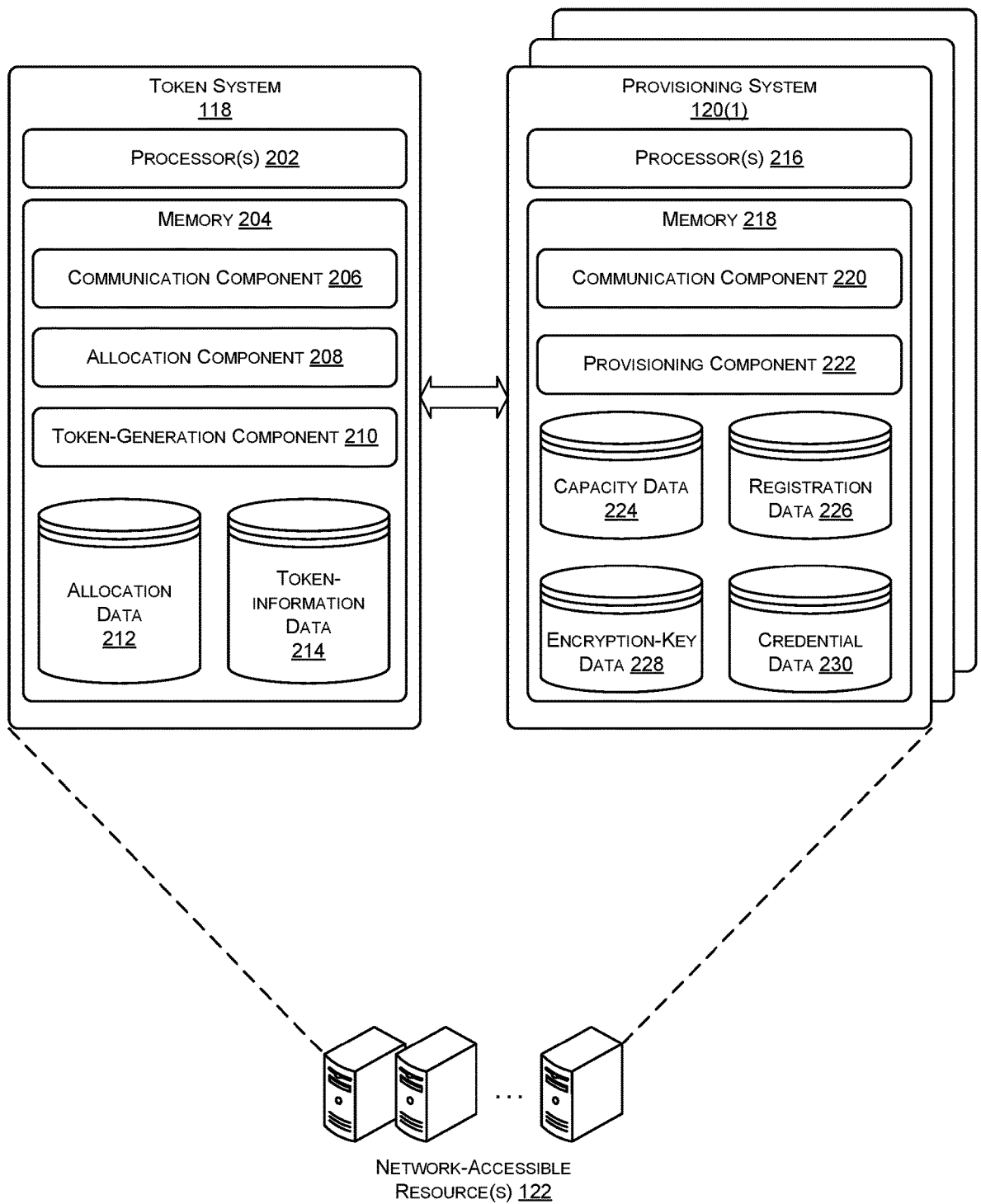
FIG. 2A illustrates example components of the token system and the provisioning system of FIG. 1.

FIG. 2A illustrates example components of the token system 118 and the provisioning system 120(1) of FIG. 1. As illustrated, the token system 118 may include one or more processors 202 and memory 204. The processors 202 may include a central processing unit (CPU) for processing data and computer-readable instructions, and the memory 204 may store computer-readable instructions that are executable on the processor(s) 202. The memory 204 may individually include volatile random access memory (RAM), non-volatile read only memory (ROM), non-volatile magnetoresistive (MRAM) and/or other types of memory.

Figure 3A:
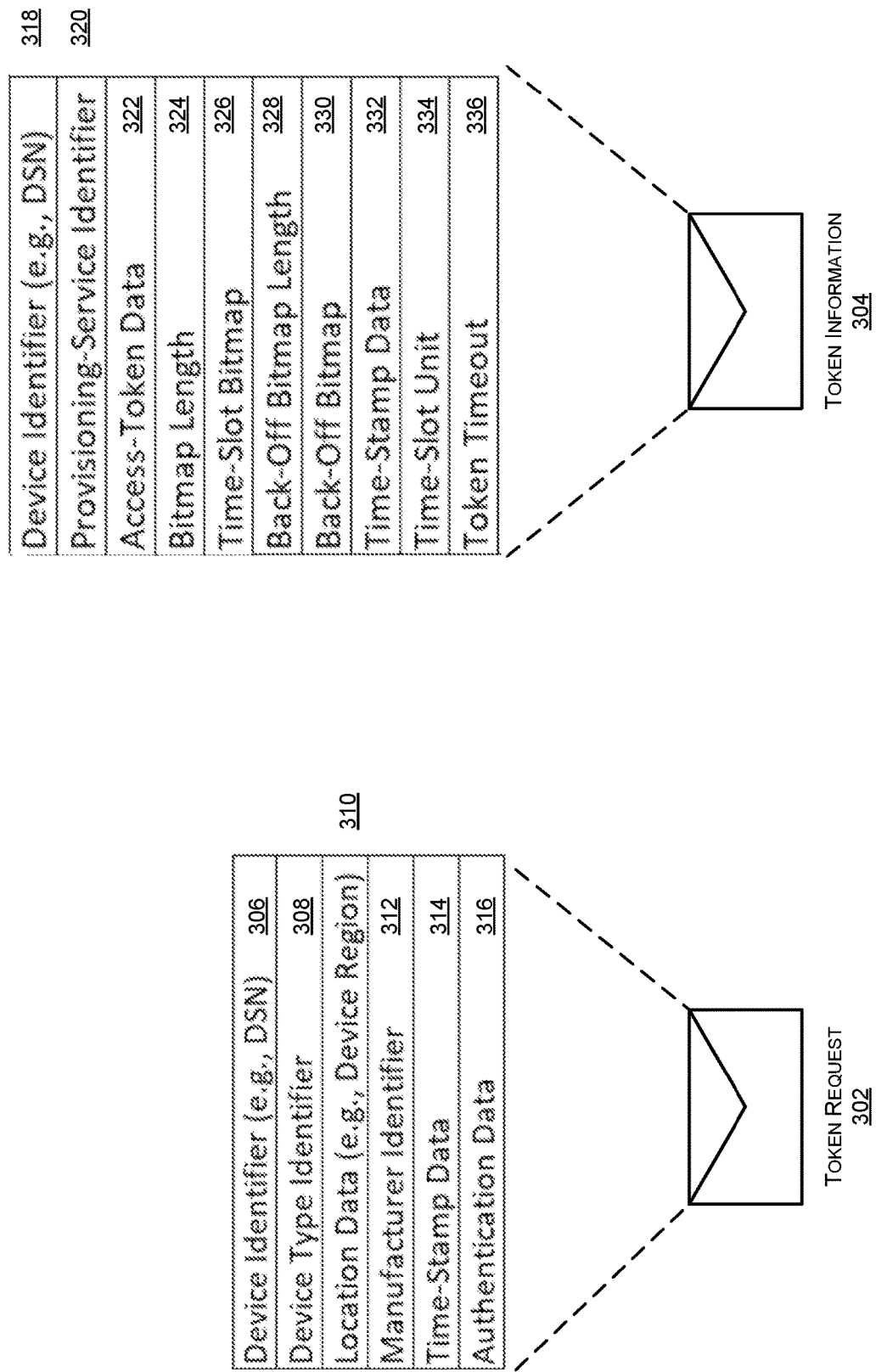
FIG. 3A illustrates example details that a token request sent by the provisioner device to the token system may include. In addition, this figure includes example details that token information sent from the token system back to the provisioner device may include. The token information may include a schedule of times (e.g., a "time-slot bitmap") indicating times at which the provisioner device is to send provisioning requests on behalf of the provisionee device to the provisioning system.

As illustrated, the memory 204 of the token system 118 may store a communication component 206, an allocation component 208, a token-generation component 210, allocation data 212, and token-information data 214. The communication component 206 may enable the token system 118 to communicate with devices, such as the provisioning device 104, and systems, such as the provisioning systems 120. The allocation component 208, meanwhile, may be configured to generate a schedule of times at which respective provisioning devices are to send respective provisioning requests such that these requests are allocated over time and do not overwhelm an individual provisioning service at any given time. Information regarding how the token system 118 has previously allocated these requests over time may be stored as the allocation data 212. The token-information data 214, meanwhile, may represent the token information that may be generated and provided to provisioning devices. FIG. 3A illustrates an example piece of token information in further detail.

The example provisioning system 120(1), meanwhile, may include one or more processors 216 and memory 218. The processors 216 may include a central processing unit (CPU) for processing data and computer-readable instructions, and the memory 218 may store computer-readable instructions that are executable on the processor(s) 216. The memory 218 may individually include volatile random access memory (RAM), non-volatile read only memory (ROM), non-volatile magnetoresistive (MRAM) and/or other types of memory.

As illustrated, the memory 218 of the provisioning system 120(1) may store a communication component 220, a provisioning component 222, capacity data 224, registration data 226, encryption-key data 228, and credential data 230. The communication component 220 may enable the provisioning system 120(1) to communicate with devices, such as the provisioning device 104, and systems, such as the token system 118. The provisioning component 222, meanwhile, may function to receiving provisioning requests from the provisioning devices and, in response, generate and send provisioning data for provisioning the provisionee devices.

The capacity data 224 may store information regarding a capacity of the provisioning system 120(1). The token system 118 may access this capacity data 224 to determine how to allocate the provisioning requests over time. The registration data 226, meanwhile, may comprise one or more registration credentials that the provisioning system 120(1) may provide to respective provisioning devices to enable the respective provisionee devise to register themselves with the appropriate content or service provider. In addition, the provisioning system 120(1) may send appropriate encryption-key data 228 to the provisioning devices for ensuring that certain communications, such as communications between the provisioning system 120(1) and the provisioner device 104 and communications between the provisioner device 104 and the provisionee device 106, are encrypted and secure. The credential data 230, meanwhile, may comprise one or more network credentials, stored in association with respective user accounts. For example, network credentials (e.g., SSID/password) associated with the access point 110 may be stored in the credential data 230 such that, upon authenticating the provisioning device 104 and/or the provisionee device 106, the provisioning system 120(1) may send the network credentials to the provisioner device 104 upon receiving a provisioning request, such that the provisioner device 104 may send these network credentials to the provisionee device to enable the provisionee device to connect to the access point 110. It is to be appreciate that the provisioning system 120(1) may only the store the credential data associated with the user account in response to previously receiving an explicit request to do so from a user associated with the user account, such as the illustrated user 114 of FIG. 1. Further, it is to be appreciated that that the credential data 230 may store SSID/password pairs (or other types of network credentials) for multiple user accounts, such as user accounts associated with respective users of the user community 102 of FIG. 1.

Figure 2B:
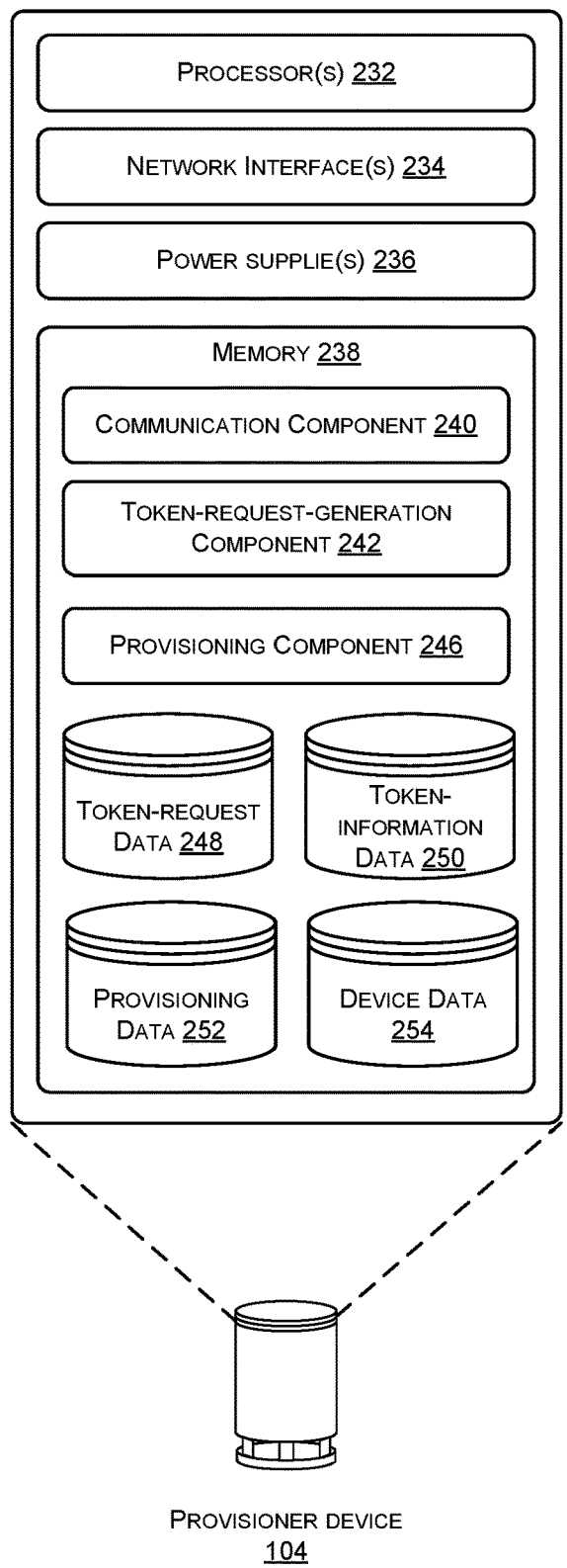
FIG. 2B illustrates example components of the provisioner device of FIG. 1.

FIG. 2B illustrates example components of the provisioner device 104. As illustrated, the provisioner device 104 may include one or more processors 232, one or more network interfaces 234, one or more power supplies 236, and memory 238. The processors 232 may include a central processing unit (CPU) for processing data and computer-readable instructions, and the memory 238 may store computer-readable instructions that are executable on the processor(s) 232. The memory 238 may individually include volatile random access memory (RAM), non-volatile read only memory (ROM), non-volatile magnetoresistive (MRAM) and/or other types of memory.

As illustrated, the memory 238 of the provisioner device may store a communication component 240, a token-request-generation component 242, a provisioning component 246, token-request data 248, token-information data 250, provisioning data 252, and device data 254. The communication component 240 may enable the provisioner device 104 to communicate, via the network interfaces 234, with other devices, such as the provisionee device 106, and one or more systems, such as the token system 118 and the provisioning system 120(1). The token-request component 242, meanwhile, may function to generate a token request in response to receiving a provisioning request from the provisionee device. FIG. 3A describes an example token request in further detail. These token requests may be stored as token-request data 248.

The provisioning component 246, meanwhile, may function to perform one or more processes for provisioning aiding in the provisioning of the provisionee device 106. For example, the provisioning component 246 may send the token requests to the token system 118 and receiving the token information in response. The token information may be stored as the token-information data 250. In addition, the provisioning component 246 may send provisioning requests to the appropriate provisioning system (identified in the token information) and may store the received data as the provisioning data 252. The provisioning component 246 may also send this provisioning data 252 to the provisionee device 106. The device data 254, meanwhile, may comprise information about the provisioner and/or provisionee devices, such as respective identifiers of these devices, location data indicating a region associated with these devices, and so forth. This information may be used to generate the token requests, as described below.

In some implementations, the processors(s) 202, 216, and/or 232 may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) 202, 216, and/or 232 may possess its own local memory, which also may store program modules, program data, and/or one or more operating systems. The processors(s) 202, 216, and/or 232 may be located in a single device or system, or across disparate devices or systems, which may be owned or operated by various entities.

The memory 204, 218, and/or 238 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 204, 218, and/or 238 may be implemented as computer-readable storage media ("CRSM"), which may be any available physical media accessible by the processor(s) 202, 216, and/or 232 to execute instructions stored on the memory 204, 218, and/or 238. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s) 202, 216, and/or 232.

FIG. 3A illustrates example details that a token request 302 sent by the provisioner device 104 to the token system 118 may include. In addition, this figure includes example details that token information 304 sent from the token system 118 back to the provisioner device 104 may include.

As illustrated, the token request 302 may include a device identifier (e.g., a device serial number (DSN)) 306 of the provisioner device 104 and a device type identifier 308 indicating a type of device of the provisioner device 104. In addition, the token request 302 may include location data 310 (such as a device region) indicating a location associated with the provisioner device 104. The token system 118 may use this location data to determine which provisioning system the provisioner device 104 is to interact with. In other instances, meanwhile, the token system 118 may determine the location of the provisioner device and, hence, the appropriate provisioning system, based on information such as an IP address of the provisioner device 104, an address or other location information stored in a user account with which the provisioner device 104 is associated, or the like.

The token request 302 may further include a manufacture identifier 312 identifying a manufacturer of the device 104, time-stamp data 314 identifying a time associated with the token request 302, and authentication data 316. In response to receiving the token request, the token system 118 may use the time-stamp data 314 to determine a latency between the provisioner device 104 and the token system 118, which in turn may be used to generate the schedule of times at which the provisioner device is to send the provisioning requests. Further, in response to receiving the token request 302, the token system may use the authentication data 316 to authenticate the token request 302 and the provisioner device 104.

The token information 304, meanwhile, may include the same device identifier 318 (e.g., DSN) to indicate that the token information has been generated for the provisioner device 104 and in response to the token request 302. The token information 304 may further include a provisioning-service identifier 320 identifying which provisioning system the provisioner device 104 is to interact with. This information may comprise an Internet Protocol (IP) address of the system, a Media Access Control (MAC) address of the system, or the like. In this example, the identifier 320 may correspond to the provisioning system 120(1), which the token service 118 may have determined is associated with the location indicated in the location data 310 of the token request 302.

The token information may further include access-token data 322, which may comprise authentication information. That is, the provisioner device 104 may send the access-token data 322 to the provisioning system 120(1) when sending the provisioning requests, such that the provisioning system 120(1) may authenticate the requests and/or the provisioning device 104. As illustrated, the token information 304 may further include a bitmap length 324, a time-slot bitmap 326, a back-off bitmap length 328, a back-off bitmap 330, time-stamp data 332, a time-slot unit 334, and a token timeout 336.

The time-slot bitmap 326 may comprise a schedule of times at which the provisioner device 104 is to send the provisioning requests to the provisioning system 120(1).

The token service 118 may have generated the time-slot bitmap 326 based on the capacity of the provisioning system 120(1) and the latency between the provisioner device 104 and the provisioning service (as determined by the latency between the device 104 and the token system 118). In addition, the token system 118 may have generated this bitmap 326 in a manner which balances these request times with request times in other bitmaps previously sent to other provisioner devices that are or will interact with the same provisioning service 120(1). That is, this bitmap 326 and each other bitmap may have been generated in a manner such that the provisioning requests by the respective devices are spread out over time and do not overwhelm the provisioning service 120(1) at any given time. In some instances, the time-slot bitmap 326 may be generated for and be unique to the provisioner device 104. In other instances, the bitmap 326 may be one of multiple different bitmaps that the token system 118 has generated and distributes to different provisioner devices. For example, the token system may utilize ten different bitmaps for a particular provisioning service and may distribute these ten bitmaps to different provisioner devices to distribute subsequent provisioning requests to the provisioning service. In still other instance, the token system may generate and distribute a common bitmap to provisioner devices but may instruct each provisioner device (or sets of provisioner devices) to start utilizing the bitmaps at different starting times, thus allocating (or "spreading out") the provisioning requests over time.

The bitmap length 324, meanwhile, may represent a total length or size of the bitmap, while the time-stamp data 332 may represent a beginning time of the bitmap. That is, the time-stamp data 332 of the token information 304 may indicate a base time from which the provisioner device 304 is to send the requests at the time indicated in the bitmap 326. In some examples, the time-stamp data 332 represents the time at which the bitmap was generated, such that the provisioner device 104 may use the time-stamp data 332 (along with the time-slot unit 334) for determining times at which to send requests.

Further, the time-slot unit 334 may indicate a length of each of the times indicated in the bitmap 326 (and the back-off bitmap 330), such as 1 second, 100 milliseconds, etc. Using the time-stamp data 332, the time-slot unit 334, and the time-slot bitmap 326 together, the provisioner device 104 may be configured to determine when to send requests. For example, if the time-stamp data 332 indicates that the bitmap was created at time one ($T_1$), the time-slot unit 334 is 100 ms, and the bitmap indicates that the provisioner device is to send requests at the third and seventh time slots, then the provisioner device 104 may be configured to send a first request at or between a time interval of $T_1+200$ ms=>$T_1+300$ ms and a second request at or between a time interval of $T_1+600$ ms=>$T_1+700$ ms. Further, while the above example indicates that the time-slot bitmap 326 indicates relative times to send requests, in other instances the time-slot bitmap 326 may indicate exact times, such as exact time-stamps or exact time-stamp ranges between which the provisioner device is to send requests.

The back-off bitmap 330, meanwhile, may comprise a schedule of times at which the provisioner device 104 is to send the retry requests to the provisioning system 120(1). The token service 118 may have generated the back-off bitmap 330 based on times that the provisioning system has indicated it has reserved for retry requests. In some instances, the token service 118 learns this information via a call to an API provided by the provisioning system 120(1). The back-off bitmap length 328, meanwhile, may represent a total length or size of the bitmap. Finally, the token timeout 336 may represent an amount of time for which the token information 304 is valid. The token timeout 336 may be specified as a time-stamp (e.g., an expiration time), an amount of time after receipt of the token information 304, an amount of provisioning requests, and/or in any other manner. After expiration of the token information 304, the provisioner device 104 may generate another token request 302 of the provisioner device 104 has not finished interacting with the provisioning system 120(1) prior to expiration of the token information 304. In another example, meanwhile, the provisioner device 104 may be configured to repeat use of the token information 304 until a new is generated and received, for a certain amount of times (e.g., three times through the time-slot bitmap 326), or the like.

FIG. 3B illustrates some examples of the information discussed above with reference to FIG. 3A. As illustrated, this figure depicts example provisioning-system capacity data 216(1), which indicates, in part, which time slots the example provisioning system 120(1) accepts provisioning requests and which time slots the system 120(1) accepts retry requests. In this example, the letter "S" represents a time slot in which the system 120(1) accepts provisioning requests, while a letter "B" represents a time slot in which the system 120(1) accepts retry requests. As illustrated, the capacity data 226(1) indicates that the provisioning system 120(1) accepts provisioning requests in time slots one through seven and nine through sixteen, while accepting retry requests in time slots eight and seventeen. Thus, the capacity data 226(1) indicates that the token system 118 is free to allocate provisioning requests (via respective bitmaps) in the time slots one through seven and nine through sixteen, while reserving time slots eight and seventeen for back-off (retry) requests.

Thus, in this example, the token system has generated an example time-slot bitmap 326(1) for the provisioner device 104 or has otherwise associated with the example bitmap 326(1) with provisioner device 104. As illustrated, this bitmap 326(1) indicates (via a "1") that the provisioner device 104 is to send provisioning requests to the provisioning system 120(1) at time slots two, six, ten, and fourteen, but not at time slots one, three to five, seven, nine, eleven through thirteen, fourteen, and fifteen (indicated via a "0"). Further, if any of these requests fail, the token system 118 has generated the back-off bitmap 330(1) indicating (via a "1") that the provisioner device 104 may send a retry request at time slots eight and seventeen, but not at other times (indicated via a "0"). In some instances, however, the time-slot bitmap 326(1) may indicate (via a "1") that the provisioner device 104 may send normal requests during the back-off time slot (e.g., slots eight and seventeen) in the event that this time slot is not needed for sending retry requests.

Figure 4A:
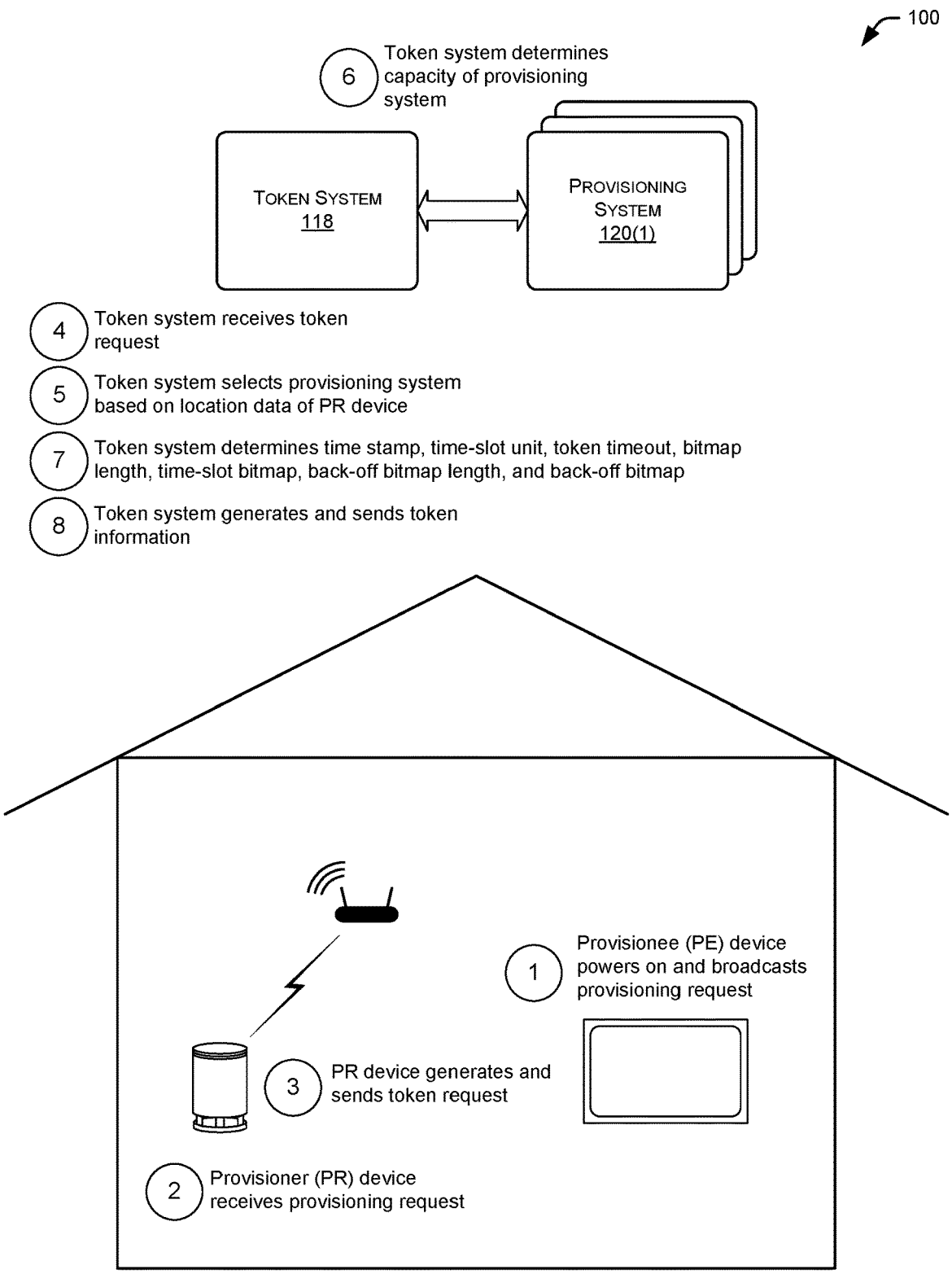
FIGS. 4A-B collectively illustrate an example sequence of operations that may occur in the environment of FIG. 1 for allocating provisioning requests made to the provisioning system over time to avoid overload on the provisioning system at any given time.
Figure 4B:
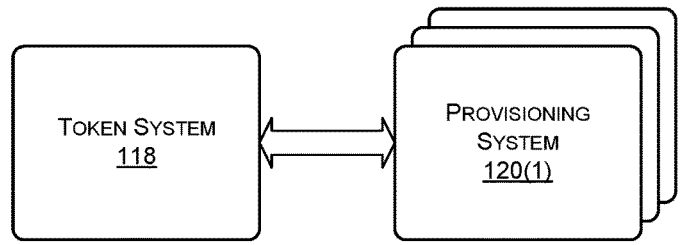
Figure 4B:
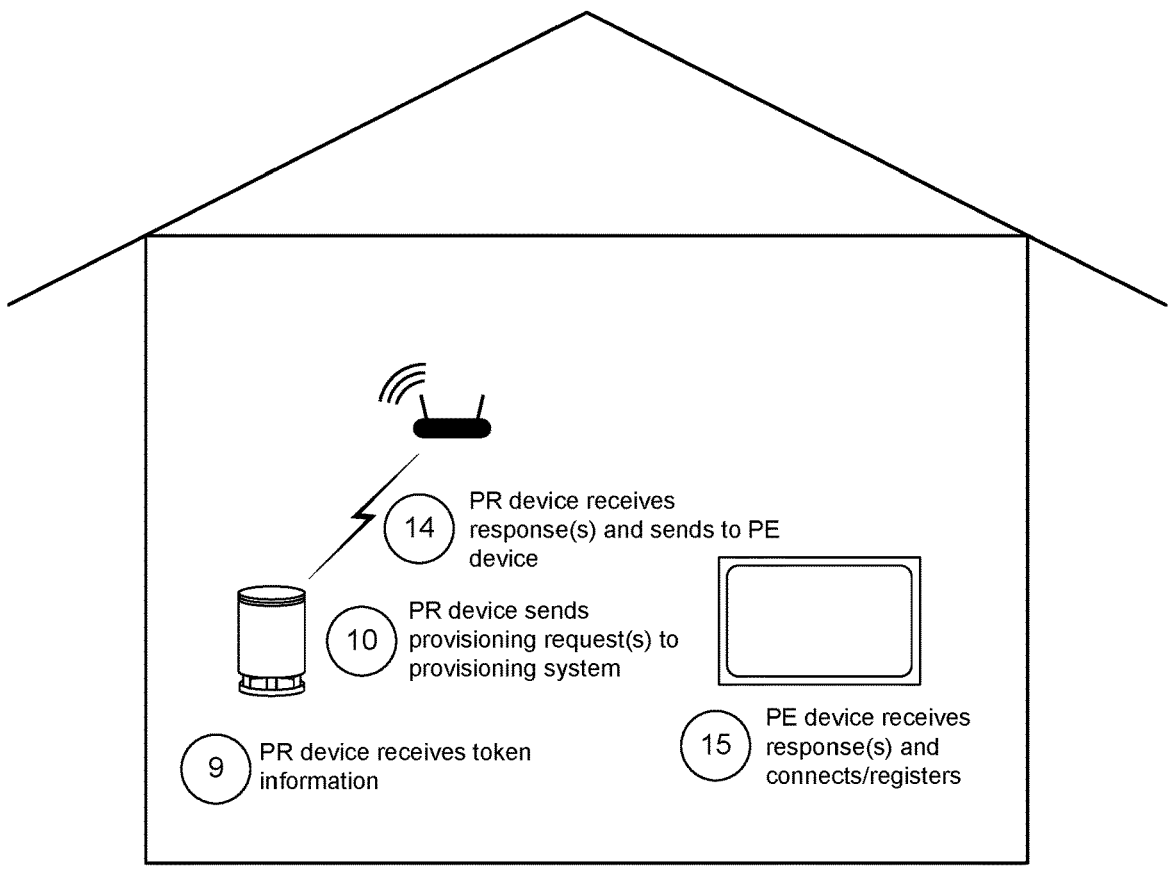

FIGS. 4A-B collectively illustrate an example sequence of operations that may occur in the environment of FIG. 1 for allocating provisioning requests made to the provisioning system over time to avoid overload on the provisioning system at any given time. As shown at "1", a provisionee device may be powered on (e.g., for a first time after distribution to a customer) and may, response, broadcast a provisioning request. For example, the provisionee device may use its communication interfaces to broadcast, over one or more short-range wireless networks (e.g. Bluetooth), a request for one or more devices in the environment to interact with a provisioning service on behalf of the provisionee device to obtain information for the provisionee device, such as a network credentials for enabling the provisionee device to connect to a local network, registration credentials to enable the provisionee device to register with a remote system (e.g., a service or content provider), and so forth.

At "2", an example provisioner device may receive this broadcasted request. For example, the provisioner device may receive the request via the short-range wireless network. In some instances, the provisioner device may already be connected to the local network and may be registered with the remote system, such as with a particular user profile to which the provisionee device has also been associated. At "3", the provisioner device generates and sends a token request to the token system. For example, the provisioner device may generate and send a token request that includes some or all the information discussed with reference to the token request 302 of FIG. 3A.

At "4", the token system 118 may receive the token request and, at "5", may select a provisioning system based on location data associated with the provisioner device. For example, the token request may include some location data, such as a region identifier or information from which the token system may deduce a location associated with the provisioner device (e.g., an IP address of the provisioner device, information stored in a user profile, etc.). At "6", the token system may determine a capacity associated with the provisioning system determined at "5". For example, the token system may call an API provided by the provisioning system to determine the capacity. This capacity data may indicate the number of requests that the provisioning system can handle, the size of time slots implemented by the provisioning system, which time slots are reserved for retry requests, and/or the like.

At "7", the token system may determine various pieces of token information, such as the pieces of the token information 304 described above with reference to FIG. 3A. This information may include a time-stamp bitmap indicating time intervals during which the provisioner device is to make provisioning requests to the provisioning system, time-stamp data indicating a time at which the token system generated the token information, a time-slot unit indicating a length of each time interval (or "slot"), a token timeout indicating when the token information expires, a bitmap length indicating a length of the time-slot bitmap, a back-off bitmap indicating time intervals at which the provisioner device is to send retry requests to the provisioning system, a back-off bitmap length indicating a length of the back-off bitmap, and/or the like. At "8", the token system may generate the token information and may send the token information to the provisioner device.

FIG. 4B continues the illustration and includes, at "9", the provisioner device receiving the token information. At "10", the provisioner device sends one or more provisioning requests to the provisioning system indicated in the token and according to the schedule of time intervals (e.g., time-slot bitmap and back-off bitmap) indicated by the token information. For example, the provisioner device may use the time-stamp data, the time-slot unit, and the time-slot bitmap to determine the appropriate time interval at which to send the respective provisioning requests. Further, the provisioner device may send these provisioning requests to the address of the provisioning system indicated in the token information. As noted above and further discussed below, the provisioning requests may include one or more requests for keys to set up a trusted communication channel with the provisionee device, one or more requests for network credentials to send along to the provisionee device, one or more requests for registration credentials to send along to the provisionee device, and so forth.

At "11", the provisioning system receives the provisioning requests and, at "12", determines whether the provisioner device and the provisionee device are associated with a common user account. For example, upon a user purchasing the provisionee device, the provisionee device may have been associated with the particular user profile of the user, which may also be associated with the provisioner device. Thus, upon receiving the initial provisioning request, the provisioning system may determine an identifier of the provisioner device and an identifier of the provisionee device (both included in the initial request), after which the provisioning system may use these identifiers to determine if both devices are associated with a common user account or profile.

In this example, the provisioning system determines that they are and, thus, begins generating and sending provisioning responses to the provisioner device at "12". Again, these responses may include key information, network credential information, registration credential information, and/or the like. At "13", the provisioner device receives the response(s) and sends these responses (and/or data based on these responses) to the provisionee device. For example, the provisioner device may send network credential information, registration credential information, and/or the like to the provisionee device, which may receive this information at "15". The provisionee device may use the network credential information to connect to the local network and, thereafter, may use the registration credential information to register the provisionee device with the provisioning system or another remote system.

Figure 5A:
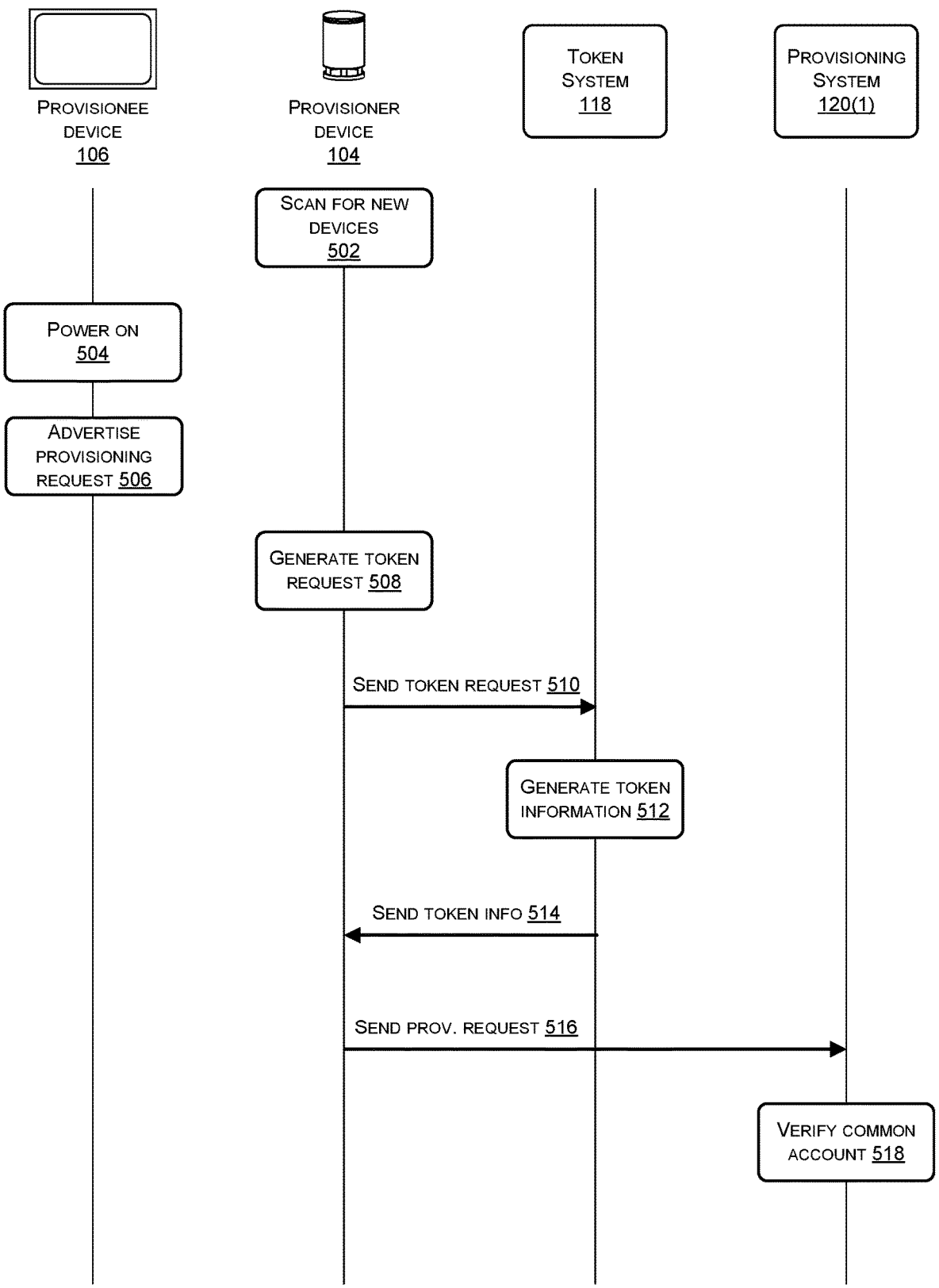
FIGS. 5A-B collectively illustrate an example diagram of operations that the provisionee device, the p device, the token system, and the provisioning system may perform to provision the provisionee device in a manner that allocates provisioning requests amongst other provisioning requests sent on behalf of other provisionee devices, thus helping ensure that the provisioning system is not overwhelmed at any given time.
Figure 5B:
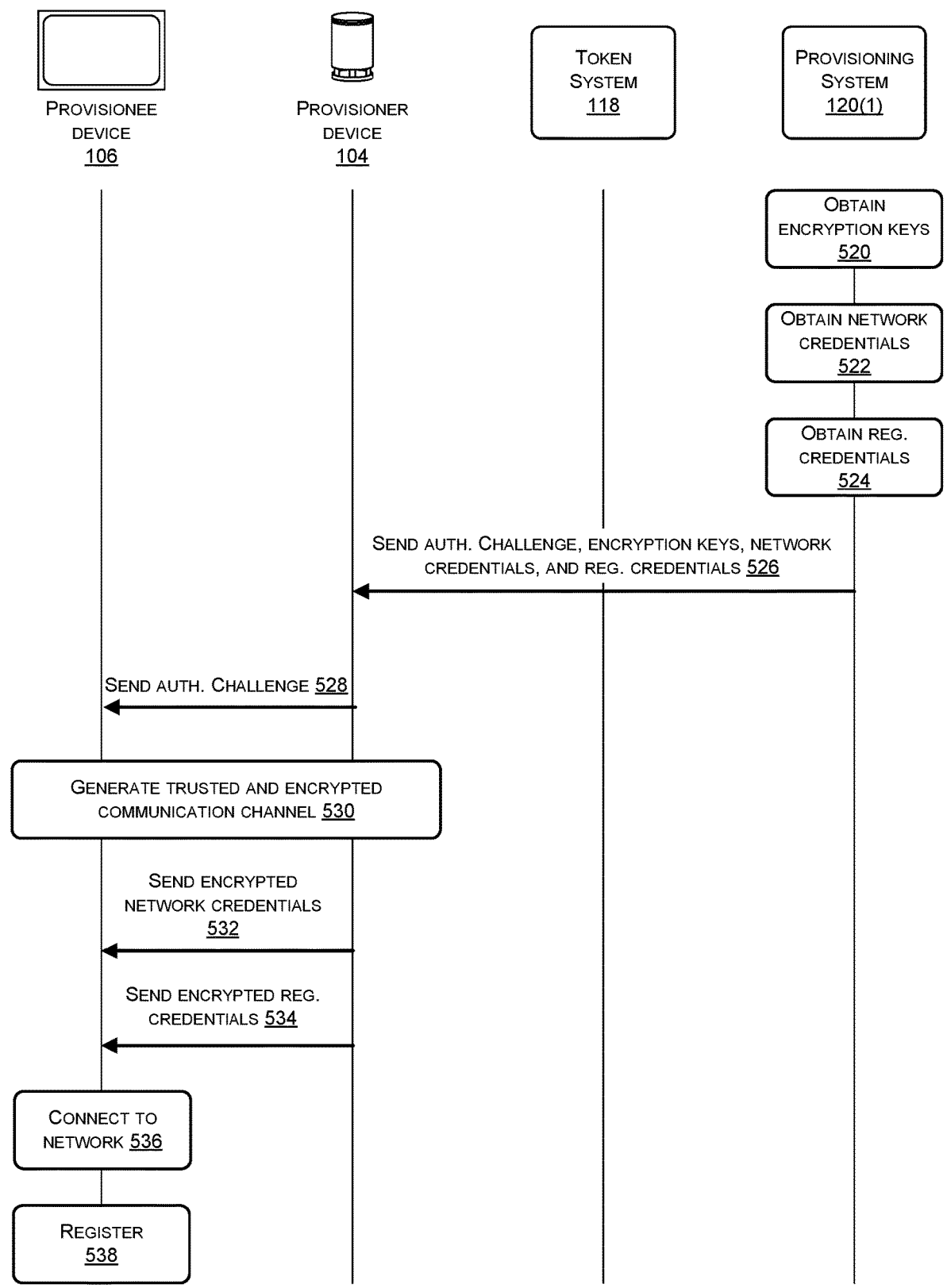

FIGS. 5A-B collectively illustrate an example diagram of operations that the provisionee device 106, the provisioner device 104, the token system 118, and the provisioning system 120(1) may perform to provision the provisionee device in a manner that allocates provisioning requests amongst other provisioning requests sent on behalf of other provisionee device, thus helping ensure that the provisioning system is not overwhelmed with provisioning requests at any given time.

To begin, an operation 502 represents that the provisioner device 104 may scan for new devices in the environment. That is, the provisioner device 104 may be configured to continuously or periodically determine whether a new device is broadcasting a provisioning request over one or more short-range wireless networks. At 504, the provisionee device 106 is powered on and, at 506, advertises a provisioning request. For example, the provisionee device may broadcast the provisioning request over a short-range wireless network.

At 508, the provisioner device 104 detects the provisioning request and, in response, generates a token request, such as the token request 302 discussed above with reference to FIG. 3A. At 510, the provisioner device 104 sends the token request to the token system 118. After receiving the request, at 512 the token system generates token information, such as the token information 304 discussed above with reference to FIG. 3A. At 514, the token system sends the token information to the provisioner device 104.

At 516, the provisioner devices sends one or more provisioning requests to the provisioning system 120(1) identified in the token information. While FIG. 5A illustrates a single request, it is to be appreciated that the provisioner device 104 and the provisioning system 120(1) may engage in one or more back-and-forth communication sessions. Further, it is to be appreciated that the provisioner device may send each respective provisioning request and, potentially, retry provisioning request according to the time intervals indicated in the token information. At 518, after receiving the initial provisioning request, the provisioning system 120(1) may verify that both the provisioner device and the provisionee device are associated with a common user account.

FIG. 5B continues the illustration and includes, at 520, the provisioning system obtaining one or more encryption keys, which the provisioner device 104 may use to create a secure and trusted communication channel with the provisionee device 106. At 522, the provisioning system 120(1) may obtain one or more network credentials (e.g., SSID and password) associated with a network in which the provisionee device resides. In some instances, these network credentials are stored in association with the user account or profile that is associated with the provisioner and provisionee devices. Further, these network credentials may correspond to a network in the environment of these devices, which may comprise the network to the which the provisioner device 104 is currently connection (e.g., a local home or office network). At 524, the provisioning system 120(1) may also obtain one or more registration credentials that may be used by the provisionee device to register with the provisioning system or another remote system after connecting to its local network using the network credentials.

At 526, the provisioning system may send, to the provisioner device, the keys, the network credentials, the registration credentials, an authorization challenge ("auth challenge"), and/or additional information. Again, while this illustrates depicts this information being sent to the provisioner device 104 in a single response, it is to be appreciated that this may occur as part of one or more back-and-forth communications with the provisioner device 104 and the provisioning system 120(1).

At 528, the provisioner device may send the auth challenge to the provisionee device 106. Assuming the provisionee device passes the auth challenge, the provisioner and provisionee devices may establish a trusted and encrypted communication channel (e.g., over a short-range wireless network) at 530. Again, creating this communication channel may involve additional, non-illustrated communications, such as the provisionee device providing a response to the auth challenge to the provisioner device 104, the provisioner device 104 sending the response to the provisioning system 120(1), the provisioning system 120(1) determining whether the response passes the auth challenge, the provisioning system 120(1) sending an indication that the response passes the auth challenge to the provisioner device 104, and so forth.

At 532, the provisioner device 104 may encrypt and send the network credentials to the provisionee device 106 and, at 534, may encrypt and send the registration credentials to the provisionee device 106. Again, while illustrated as single communications, in some instances the respective credentials may be sent over multiple communications. At 536, the provisionee device 106 may use the network credentials to connect to the local network and, at 538, may use the registration credentials to register with a remote system.

Figure 6:
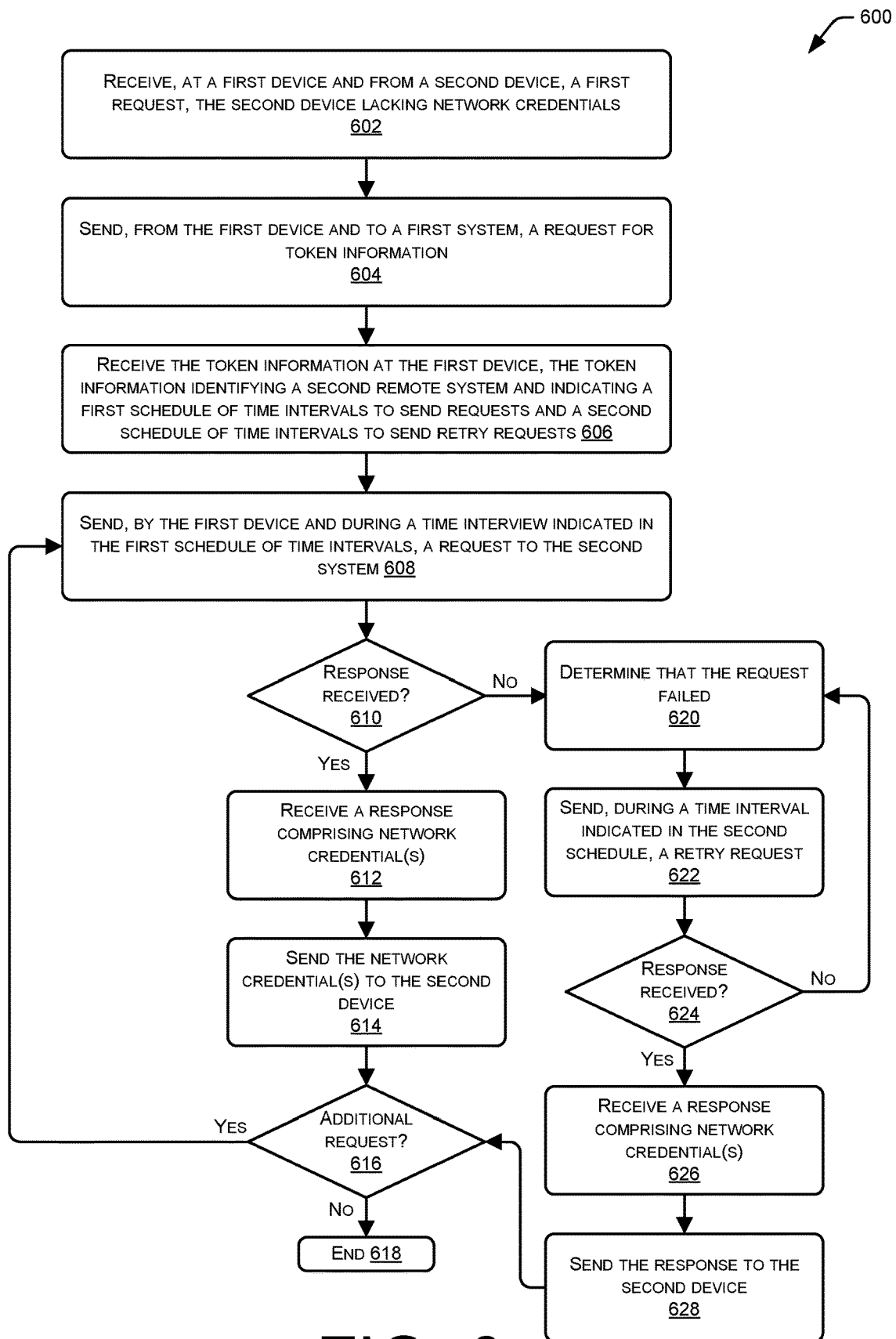
FIG. 6 illustrates a flow diagram of an example process that a provisioner device may implement for provisioning a provisionee device using the techniques described herein.

FIG. 6 illustrates a flow diagram of an example process 600 that a provisioner device may implement for provisioning a provisionee device using the techniques described herein. The process 600, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At an operation 602, a first client computing device residing in an environment may receive a first request from a second client computing device that also resides in the environment. In some instances, the second client computing device may lack network credentials (e.g., SSID and/or password) for connecting to a network to which the first client computing device is connected. In some instances, the first request may comprise the broadcasted provisioning request described above.

At an operation 604, the first device may send, via the network and to a first system that is remote from the environment, a request for token information. In some instances, this request may comprise the token request 302 and may be sent to the token system 118, as described above.

At an operation 606, the first device may receive the token information from the first system. In some instance, the token information may comprise the token information 304 discussed above and, thus, may include first data identifying a second remote system, as well as second data comprising a schedule of time intervals during which the first client computing device is to send respective requests to the second system to provision the second client computing device. In some instances, the token information may also include data comprising another schedule of time intervals during which the first client computing device is to send respective retry requests to the second system to provision the second client computing device if one or more initial provisioning requests fail (e.g., because no response is received from the second system, because the first device is unable to send the provisioning requests, etc.).

At an operation 608, the first client computing may send, during a time interval indicated by the schedule of time intervals, a request to the second system indicated in the token information. For example, this request may comprise a request for network credentials, registration credentials, or the like.

An operation 610 represents determining whether a response is received from the second system. If so, then an operation 612 represents receiving, in this example, one or more network credentials from the second system and at the first client computing device. At an operation 614, the first client computing device sends the network credentials to the second client computing device, which may use the network credentials to connect to the local network. An operation 616, meanwhile, represents determining whether to send another request. If so, the process 600 may loop back to the operation 608. If not, the process 600 may end at 618.

If, however, the first client computing device does not receive a response at the operation 610, then at an operation 620 the first client computing device may determine that the request sent at the operation 608 has failed. At an operation 622, the first client computing device sends, during a time interval indicated in the second schedule of time intervals, a retry request to the second system. At an operation 624, the first client computing device determines whether a response to the retry request has been received. If not, then the process 600 may loop back to the operation 620. If so, then an operation 626 represents receiving, in this example, one or more network credentials from the second system and at the first client computing device. At an operation 628, the first client computing device sends the network credentials to the second client computing device, which may use the network credentials to connect to the local network. The process 600 may then proceed to the operation 616, which represents determining whether to send another request. If so, the process 600 may loop back to the operation 608. If not, the process 600 may end at 618.

Figure 7:
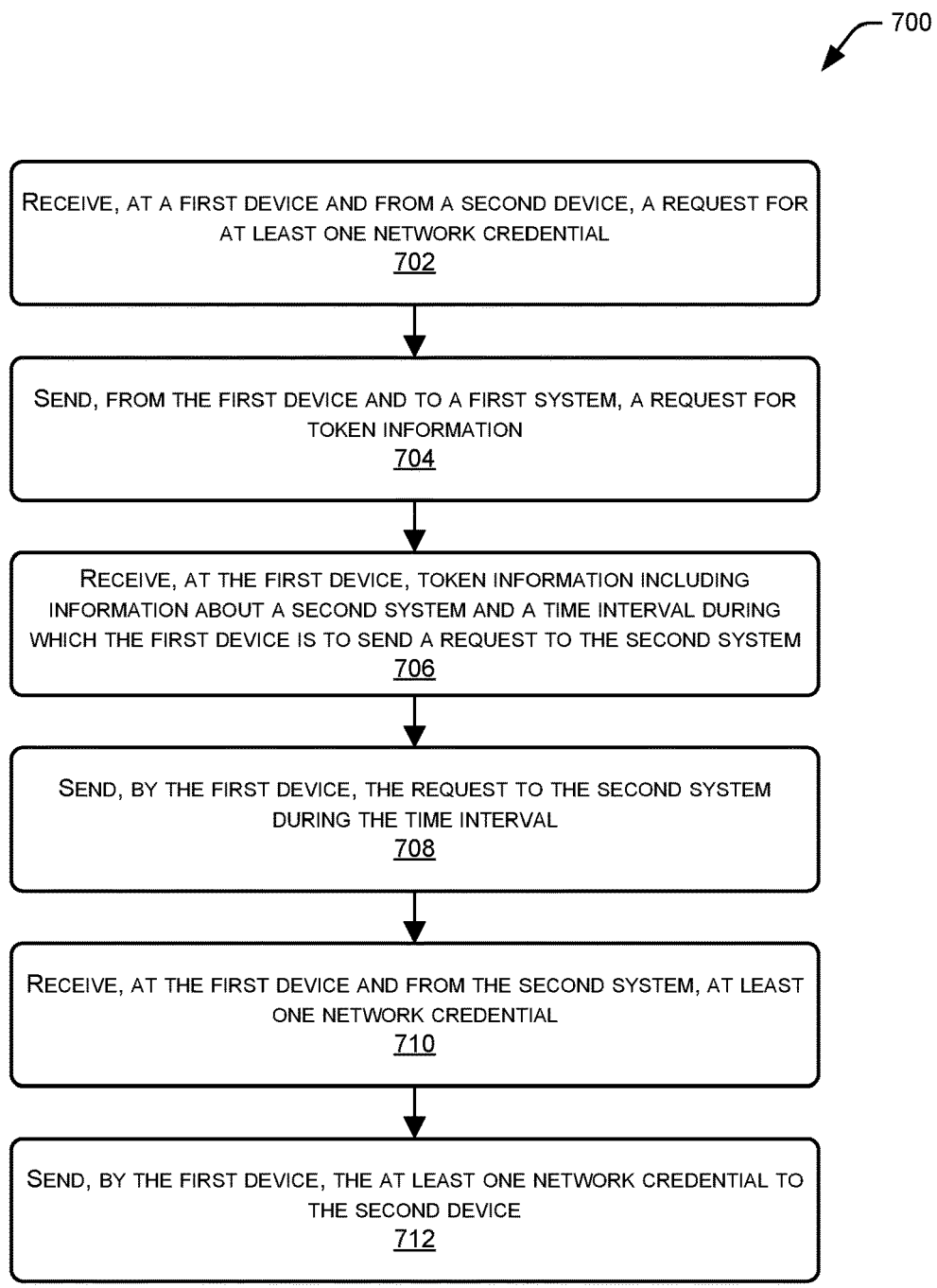
FIG. 7 illustrates a flow diagram of another example process that a provisioner device may implement for provisioning a provisionee device using the techniques described herein.

FIG. 7 illustrates a flow diagram of another example process 700 that a provisioner device may implement for provisioning a provisionee device using the techniques described herein. At an operation 702, a first device in an environment may receive, from a second device in the environment, a request for at least one network credential for connecting to a network in the environment to which the first device is already connected. At an operation 704, the first device sends, over the network, a request for token information to a first system. For example, the first device may send a token request 302 to the token system 118, as described above.

At an operation 706, the first device may receive, from the first system in response to the request sent at the operation 704, token information including information about a second system and information about at least one time interval during which to send a request to the second system. This token information may include an identifier (e.g., IP address, MAC address, etc.) of the second system and, in some instances, a schedule of time intervals at which the first device is to send requests to the second system. That is, the time interval of the operation 706 may be part of a first number of time intervals, such as the time-slot bitmap discussed above.

At an operation 708, the first sends a request to the second system during the time interval indicated at the operation 706. At an operation 710, the first device may receive, from the second system, at least one network credential. At an operation 712, the first device sends the at least one network credential to the second device.

Figure 8:
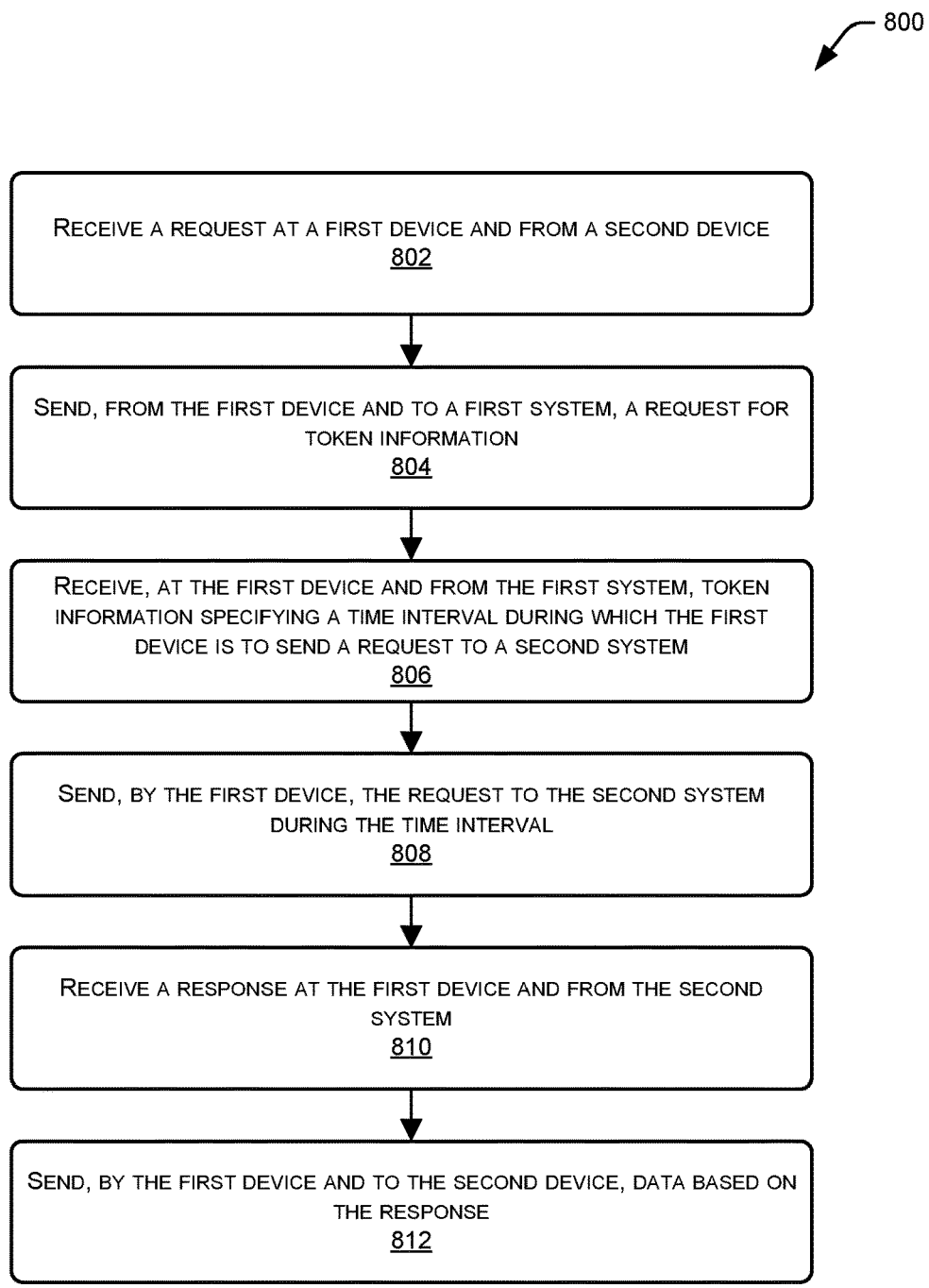
FIG. 8 illustrates a flow diagram of an example process for generating token information that results in client devices sending subsequent requests at different times from one another.

FIG. 8 illustrates a flow diagram of an example process 800 for generating token information that results in client devices sending subsequent requests at different times from one another. At an operation 802, a first device in an environment may receive a request from a second device in the environment. This request may comprise a request for a network credential, a request for an application update, a request to log data, and/or any other type of request. At an operation 804, the first device sends, over a network, a request for token information to a first system.

At an operation 806, the first device may receive, from the first system in response to the request sent at the operation 704, token information including information about a second system and at least one time interval during which to send a request to the second system. This token information may include an identifier (e.g., IP address, MAC address, etc.) of the second system and, in some instances, a schedule of time intervals at which the first device is to send requests to the second system.

At an operation 808, the first sends a request to the second system during the time interval indicated at the operation 806. At an operation 810, the first device may receive a response from the second system. This response may include an application update, a network credential, and/or the like.

At an operation 812, the first device sends data based on the response to the second device.

Figure 9:
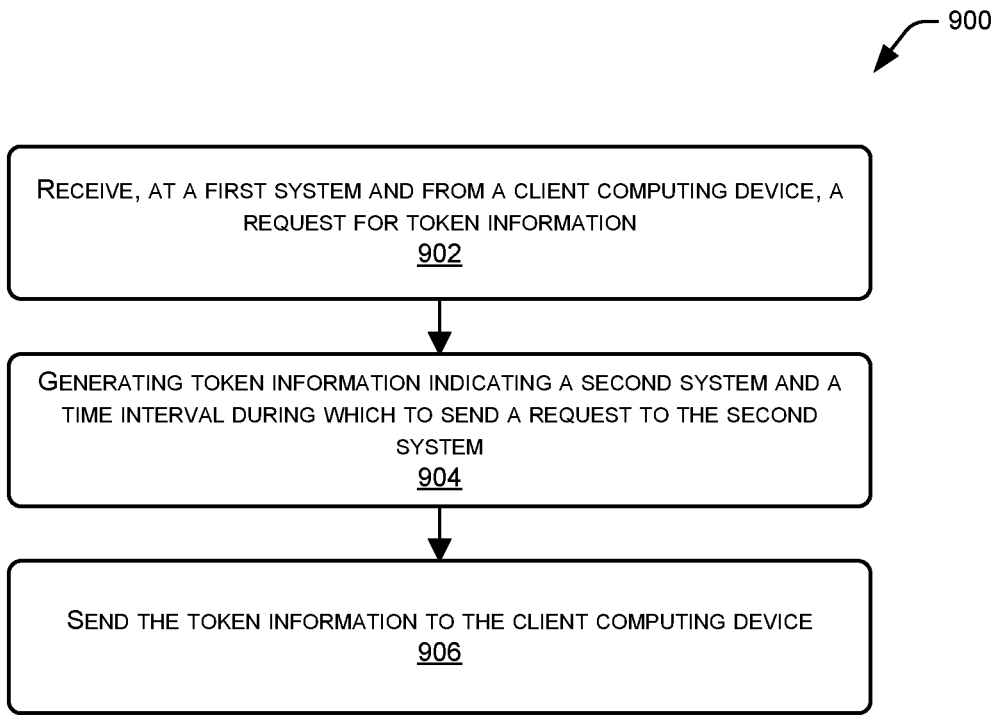
FIG. 9 illustrates a flow diagram of an example process that a token system may implement in response to receiving a token request from a provisioner device using the techniques described herein.

FIG. 9 illustrates a flow diagram of an example process 900 that a token system may implement in response to receiving a token request from a provisioner device using the techniques described herein. An operation 902 represents that a first system, such as the token system 118 described above, may receive a token request from a client computing device. In some instances, the token request may comprise the token request 302 described above with reference to FIG. 3A. At an operation 904, the first system may generate token information indicating a second system (e.g., a provisioning system) and information indicating at least one time interval during which the client computing device is to send a request to the second system. For example, the token information may comprise the token information 304 described above with reference to FIG. 3A. At an operation 906, the first system may send the token information to the client computing device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a first device, the method comprising:
   sending, by the first device and over a network, a first token request to a first system;
   receiving, by the first device and from the first system in response to the first token request, token information including information about a second system and specifying a first time interval within which the first device is to send a first provisioning request to the second system, wherein the first system selected the first time interval based on the first time interval not overlapping with a second time interval previously selected by the first system for a second device within which the second device is to send a second provisioning request to the second system;
   sending, by the first device and at a time within the first time interval, the first provisioning request to the second system;
   receiving, by the first device and from the second system, a response including network credential information associated with the network; and
   sending the network credential information to a third device.

2. The method as recited in claim 1, wherein the first time interval is part of a first set of time intervals specified in the token information, the first system selecting time intervals of the first set based on the time intervals of the first set not overlapping with time intervals of a second set of time intervals selected for the second device.

3. The method as recited in claim 2, wherein the receiving the token information further comprises receiving the token information that further includes time-stamp data indicating a time at which the first system generated the first set of time intervals.

4. The method as recited in claim 2, wherein the receiving the token information further comprises receiving the token information indicating a time-slot length associated with each time interval indicated in the first set of time intervals.

5. The method as recited in claim 1, wherein the receiving the token information further comprises receiving the token information indicating a third time interval during which the first device is to send a retry request.

6. The method as recited in claim 1, wherein the receiving the token information further comprises receiving the token information indicating a number of time intervals at which the first device is to send respective retry requests to the second system.

7. The method as recited in claim 1, wherein the receiving the token information further comprises receiving the token information indicating a time at which the token information expires.

8. The method as recited in claim 1, further comprising:
sending, over the network and to the first system, location data indicating a location associated with the first device;
and wherein the second system is associated with the location.

9. A first computing device comprising:
one or more hardware processors; and
one or more computer-readable media storing computer-executable instructions that, when executed, cause the one or more hardware processors to perform acts comprising:
sending, by the first computing device and over a network, a first token request to a first system;
receiving, by the first computing device and from the first system in response to the first token request, token information including information about a second system and specifying a first time interval within which the first computing device is to send a first provisioning request to the second system, wherein the first system selected the first time interval based on the first time interval not overlapping with a second time interval previously selected by the first system for a second computing device within which the second computing device is to send a second provisioning request to the second system;
sending, by the first computing device and at a time within the first time interval, the first provisioning request to the second system; and
receiving, by the first computing device and over the network, a response from the second system.

10. The first computing device as recited in claim 9, wherein the one or more computer-readable media further store computer-executable instructions that, when executed, cause the one or more hardware processors to perform an act comprising sending data to a third computing device, the data being based at last in part on the response from the second system.

11. The first computing device as recited in claim 10, wherein the receiving the response from the second system comprises receiving a network credential for accessing the network.

12. The first computing device as recited in claim 10, wherein the receiving the response from the second system comprises receiving an update to an application stored on the third computing device.

13. The first computing device as recited in claim 9, wherein the first time interval is part of a first number of time intervals specified in the token information.

14. The first computing device as recited in claim 9, wherein the one or more computer-readable media further store computer-executable instructions that, when executed, cause the one or more hardware processors to perform acts comprising:
sending, over the network and to the first system, location data indicating a location associated with the first computing device;
and wherein the second system is associated with the location.

15. The first computing device as recited in claim 9, wherein the receiving the token information further comprises receiving the token information that further includes time-stamp data indicating a time at which the first system generated a first number of time intervals that includes the time interval.

16. The first computing device as recited in claim 15, wherein the receiving the token information further comprises receiving the token information indicating a time-slot length associated with each time interval indicated in the first number of time intervals.

17. One or more computer-readable media storing computer-executable instructions that, when executed, cause one or more hardware processors of a first electronic device to perform acts comprising:
sending, by the first electronic device and over a network, a first token request to a first system;
receiving, by the first electronic device and from the first system in response to the first token request, token information including information about a second system and specifying a first time interval within which the first electronic device is to send a first provisioning request to the second system, wherein the first system selected the first time interval based on the first time interval not overlapping with a second time interval previously selected by the first system for a second electronic device within which the second electronic device is to send a second provisioning request to the second system;
sending, by the first electronic device and at a time within the first time interval, the first provisioning request to the second system; and
receiving, by the first electronic device and over the network, a response from the second system.

18. The one or more computer-readable media as recited in claim 17, further storing computer-executable instructions that, when executed, cause the one or more hardware processors to perform an act comprising sending data to a third computing device, the data being based at last in part on the response from the second system.

19. The one or more computer-readable media as recited in claim 18, wherein the receiving the response from the second system comprises receiving a network credential for accessing the network.

20. The one or more computer-readable media as recited in claim 18, wherein the receiving the response from the second system comprises receiving an update to an application stored on the third computing device.

* * * * *